(12) United States Patent
Altman (10) Patent No.: US 6,396,964 B1
(45) Date of Patent: May 28, 2002

(54) SYSTEMS, PROCESSES AND PRODUCTS FOR NETWORK STORAGE AND RETRIEVAL OF PHYSICAL PAPER DOCUMENTS, ELECTRO-OPTICALLY GENERATED ELECTRONIC DOCUMENTS, AND COMPUTER GENERATED ELECTRONIC DOCUMENTS (75) Inventor: Gerald Altman, Newton, MA (US)

(73) Assignee: Papercomp, Inc., Newton, MA (US)

( * ) Notice: Subject to any disclaimer, the term of this patent is extended or adjusted under 35 U.S.C. 154(b) by 52 days.

(21) Appl. No.: 09/628,613

(22) Filed: Jul. 31, 2000

Related U.S. Application Data (63) Continuation-in-part of application No. 08/882,833, filed on Jun. 26, 1997.
(60) Provisional application No. 60/020,902, filed on Jun. 27, 1996.

(51) Int. Cl.[7] .................................................. G06K 9/54
(52) U.S. Cl. ........................ 382/306; 707/10; 707/204
(58) Field of Search ......................... 382/140, 305–306; 707/2, 200, 10, 204

(56) References Cited

U.S. PATENT DOCUMENTS

| | | | | |
|---|---|---|---|---|
| 5,490,217 A | * | 2/1996 | Wang et al. ................. 710/268 |
| 5,572,726 A | * | 11/1996 | Hasuo ......................... 707/200 |
| 5,602,936 A | * | 2/1997 | Green et al. ................. 382/140 |
| 5,813,009 A | * | 9/1998 | Johnson et al. ............. 707/100 |
| 5,889,896 A | * | 3/1999 | Meshinsky et al. ......... 382/305 |
| 5,913,205 A | * | 6/1999 | Jain et al. ....................... 707/2 |
| 6,052,494 A | * | 4/2000 | Ohtani ........................ 382/306 |
| 6,092,023 A | * | 7/2000 | Kunishige ...................... 702/1 |

* cited by examiner

Primary Examiner—Matthew C. Bella
Assistant Examiner—Gregory Desire
(74) Attorney, Agent, or Firm—Morse, Altman & Martin (57) ABSTRACT

A network having a plurality of distributed systems at different geographical locations permits the random scanning of original documents at the different scanning locations and the storage of the original documents at precisely known storage locations. Original documents are identified by the date/time instances at which they have been scanned and are stored in containers that are marked with corresponding ranges of the date/time instances. Resulting images are identified by the date/time instances of scanning and may be organized electronically. The locations of original documents are immediately known to be in the containers that are marked with ranges of corresponding date/time instances.

18 Claims, 6 Drawing Sheets

TABLE 1

| Entry Date/Time | DocPublish Date | Doc ImageText | Project No | Entity Code | Doc Author/ Source | Account Location | Doc Whole/Part | DocView |
|---|---|---|---|---|---|---|---|---|
| | | | | | | | | |
| | | | | | | | | |
| | | | | | | | | |

Entry Date/Time of scan or text - yy/mm/dd/hh/nn/ss data type

Electronic Image or text documents - OLE object linking/embedding data type

Fig. 7

TABLE 2

| Entity Code | Entity Name | Entity Address | Entity Information | Entity TelNo | Entity FaxNo | Entity Email | Reference Code | Reference Info |
|---|---|---|---|---|---|---|---|---|
| | | | | | | | | |
| | | | | | | | | |
| | | | | | | | | |

Primary field in Table 2
Secondary field in Table 1

Fig. 8

Table 3

| ProjectNo | Project Kind | Project Name | Security Level | Action DueDate | Action DoneDate | Review DueDate | Review DoneDate | Transaction No |
|---|---|---|---|---|---|---|---|---|
| | | | | | | | | |
| | | | | | | | | |
| | | | | | | | | |

Primary field in Table 3
Secondary field in Table 1

Fig. 9

Query

| Entity Code | Entry Date/Time | ProjectNo | DocView |
|---|---|---|---|
| | | | |
| | | | |
| | | | |

Storage locations of scanned physical papers uniquely identified by scan date/time

Fig. 10

SYSTEMS, PROCESSES AND PRODUCTS FOR NETWORK STORAGE AND RETRIEVAL OF PHYSICAL PAPER DOCUMENTS, ELECTRO-OPTICALLY GENERATED ELECTRONIC DOCUMENTS, AND COMPUTER GENERATED ELECTRONIC DOCUMENTS

RELATED APPLICATIONS

The present application is a continuation-in-part of co-pending application Ser. No. 08/882,833, filed on Jun. 26, 1997 in the name of Gerald Altman for System and Method for Storing and Retrieving Matched Paper Documents and Electronic Images, which in turn is based upon the disclosure and filing date of provisional Application No. 60/020,902, filed on Jun. 27, 1996 in the name of Gerald Altman for Matched Electronic And Paper Documents In An Integrated Storage And Retrieval System.

BACKGROUND OF THE INVENTION

1. Field of the Invention

The present invention relates to systems, processes and products for the storage and retrieval of documentary information, including: physical paper documents; corresponding electro-optically generated electronic documents, e.g. digital images produced by scanning or photography; and computer generated electronic documents, e.g. digital text produced by word processing and/or digital graphics produced by computer aided design.

2. The Prior Art

Numerous systems and processes have been proposed for the storage and retrieval of documentary information. Traditional practices over the centuries, of course, have involved storage and retrieval by manually accessing indexed arrangements of original papers and "hard copies" in folders, boxes, shelving and cabinets. Later practices have involved photographically reducing the original papers to produce indexed miniaturizations in microfilm spools or microfiche sheets, storing the spools or sheets in indexed containers, folders or other physical repositories, and retrieving images or hard copies of the miniaturizations by optical projection or photographic reproduction.

Now there are a proliferation of proposals for digital computer systems that opto-electronically scan original papers to create electronic representations in computer memory, to store digital records of these representations in magnetic and/or optical media, and to retrieve images or hard copies corresponding to these records electromagnetically or electro-optically. It is common experience that effective paper filing systems have required unerring care by trustworthy persons who have some understanding of the business or other activity involved. Considerable reliance has been placed on the memory of such persons, who have a tendency to become "indispensable" in mission critical situations. Moreover, even a generally effective system often is not conducive to physical and logical arrangements capable of implementing prompt storage and retrieval without constant inquiries to and guidance by professional level personnel. Finally, of course, a paper file is available to only one person at a time unless hard copies are made, in which case undesired paper proliferation occurs.

Although a few, but not all, of these problems are alleviated by the use of microfilm and microfiche, new and different problems arise. It is true that a large number of photographic miniaturizations can be stored in a much smaller space than an equivalent number of original papers. However, problems of storing and retrieving containers and folders of microfilm and microfiche are not unlike problems of storing and retrieving batches of their paper counterparts. More important, producing, imaging and retrieving photographic miniaturizations often are costly procedures requiring unwieldy hardware. As a practical matter, microfilm and microfiche are limited to archival-type documentation that may not be compatible with a dynamic work environment.

Recent advances in low cost computer architecture, particularly, faster clock speeds, higher resolution displays, and denser storage media, have generated discussions of whether or not a "paperless office" is possible, and, indeed, what is the meaning of "paperless office." The difficulties mentioned above in connection with the storage and retrieval of paper documents, in a work environment, make it clear that minimization of the use of paper must be a preeminent commercial and technological objective. A critical advantage of electronic files over paper and microfilm/microfiche files is that electronic files can be readily sorted, retrieved and reorganized.

It is apparent that electronic files are capable of obviating tedious manipulation of original paper files when there may be no further need ever to refer to them. Nevertheless, despite the rapid growth of electronic filing, paper documents continue to proliferate. One possible reason for this phenomenon is a natural reluctance on the part of many to discard original paper files even after they have been imaged and stored in electronic media. For many, it simply will be difficult to overcome a habitual predilection to keep paper documents, and to accept the idea that electronic media, in many cases, is a secure and relatively versatile substitute.

Furthermore, in many cases, reference to papers or other original physical documents, even if infrequent, may be essential. For example, original physical documents may be required or desired: (1) in litigation where rules of evidence pertain; (2) as backup in the event that lost or faulty images are discovered later; (3) in major commercial, financial and insurance dealings where physical signatures may be important or merely may be perceived to be important; (4) in internet transactions where the parties do not meet legal requirements for dispensing with paper records; (5) as backup for technical graphics, precision photographs, medical diagnostics, and the like, where differences in resolution between images and originals may become significant; (6) as backup in the event of corruption of electronic files; and (7) as complete copies of voluminous treatises in which only the table of contents and/or other selected portions have been imaged.

Modern society demands knowledge work that is appropriate for the information age. The requirements are that: relatively low paying manual work, like filing paper documents, must be phased out, and relatively high paying knowledge work, like processing electronic documents, must be phased in. The fact is that total elimination of paper documents may be unachievable or undesirable. Rather, the present invention is based on the insight that there is an essential interaction between minimizing the inherent inefficiency of paper documents, and maximizing the inherent efficiency of electronic documents.

Much confusion has been encountered in the implementation of systems that are based on: (1) imaged electronic documents of the type that is created by scanning or photographing paper documents and the like, (2) original paper documents themselves, and (3) computer generated electronic documents of the type that are created by word processors and the like. The following are some of the conflicts involved: whether to store bit maps based on simple scanning, or text resulting from optical character recognition, or both; whether to mix optically generated electronic documents and computer generated electronic documents; whether or not the storage of optically generated electronic image files should mirror the storage of the original paper documents; whether or not an original paper filing system should be retained without change; whether or not a system is so sophisticated that computer literate professional level operators and/or supervisors are required; and whether or not a system is so rudimentary that even entry level operators may be sufficiently trustworthy.

The foregoing problems are greatly magnified in networked systems, where difficulties may be encountered particularly in standardizing, at disparate locations, the storage and retrieval of original physical paper documents, and, possibly, hard paper copies of electro-optically generated and computer generated documents. There is a requirement for systems in which the physical filing of paper documents is radically simplified, in which access to infrequently needed paper documents is precisely indicated, and in which optically generated electronic documents and computer generated electronic documents are clearly differentiated.

SUMMARY OF THE INVENTION

The primary object of the present invention is to provide, for the storage and retrieval of original physical paper documents, electro-optically generated electronic documents, and computer generated electronic documents: systems, processes and products, which facilitate the use of electronic documents rather than paper documents whenever feasible or acceptable, and which facilitate the use of paper documents rather than electronic documents whenever necessary or preferred. The result is less physical and emotional frustration, and more creative use of time.

Pursuant to the present invention, at each location in an enterprise comprising a network or group of networks: (1) newly received or generated electronic documents are simply entered at random in a sequence of date/time instances by computer generation and/or by electro-optical processing of physical paper documents; (2) the records of electronic documents reference the date/time instances that constitute unique identifiers; (3) each of the paper documents is added to the beginning or end of a cumulative stack in which its location is indicated by its date/time instance; and (4) the electronic documents are processed and organized to provide the electronic equivalent of virtual files that include related paper and electronic documents.

In one preferred embodiment, a physical system includes a primary physical repository and a plurality of secondary physical repositories therein, which hold selected sequences of paper documents corresponding to selected ranges of the date/time instances. The selected ranges of the sequences of paper documents are contained by selected ones of the secondary physical repositories. The selected ones of the secondary physical repositories are visually marked with physical indicia corresponding to the selected ranges of the date/time instances. The electronic system presents an electronic table representing a grid containing rows of electronic records and columns of electronic fields, the electronic fields including a plurality of primary electronic fields and a plurality of secondary electronic fields. One of the primary field includes date/time entries that designate corresponding logical groups of paper documents and corresponding logical groups of electronic documents. The secondary fields include other entries that designate corresponding logical groups of the paper documents and electronic groups of the electronic documents.

The result is an interactive combination of electronic records, which specify the precise physical locations of selected paper documents in terms of their date/time instances. Selected date/time instances designate selected logical groups of the paper documents and selected logical groups of electronic images. The selected logical groups of the paper documents are virtual collections that are intermingled throughout the secondary repositories so as to be unadapted for immediate physical compilation. The selected logical groups of electronic images are immediately available for presentation.

BRIEF DESCRIPTION OF THE DRAWINGS

For a fuller understanding of the nature and objects of the present invention, reference is made to the following specification, which is to be taken in connection with the accompanying drawings wherein.

DETAILED DESCRIPTION OF THE PREFERRED EMBODIMENT

Figure 1:
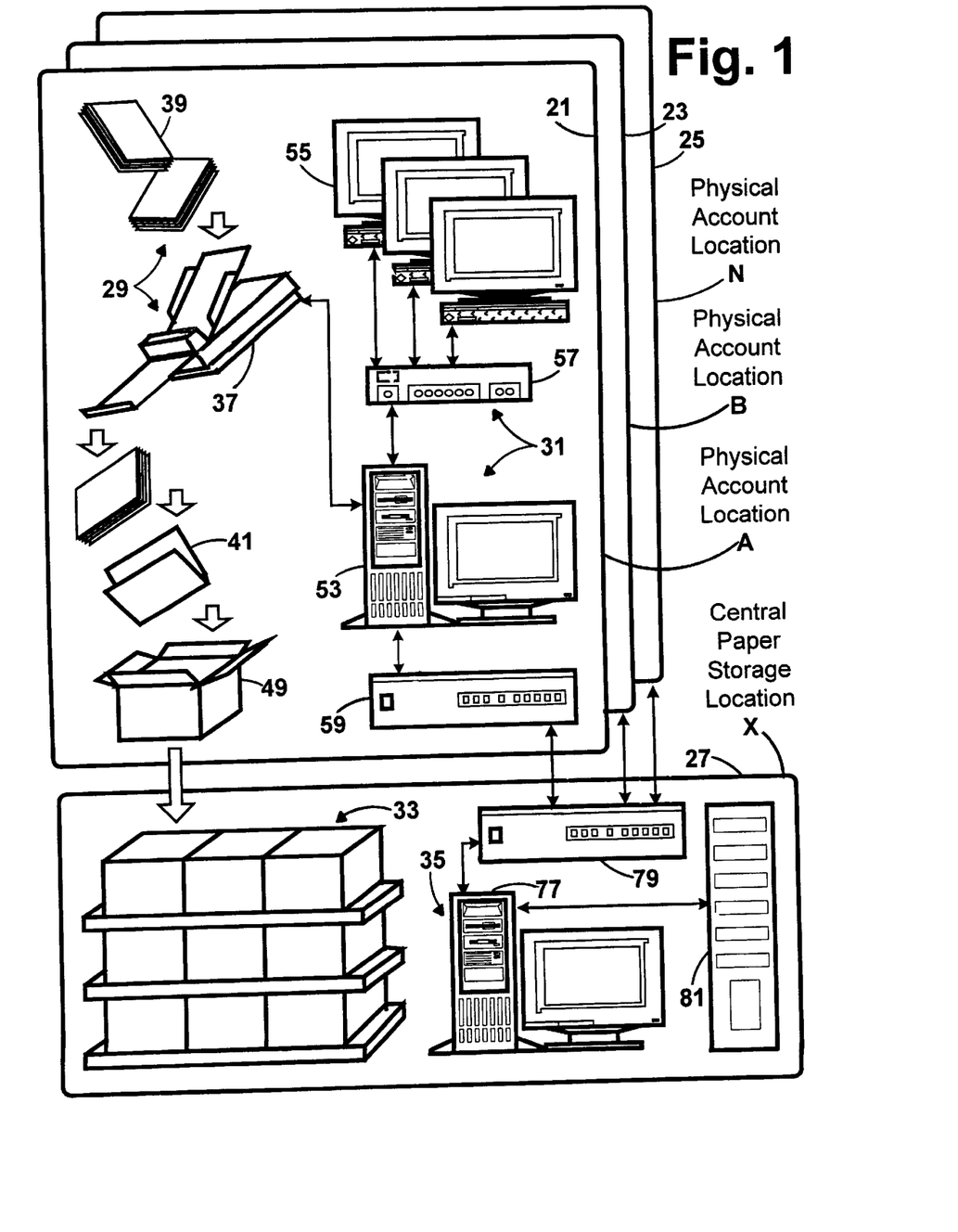
FIG. 1 illustrates an enterprise system embodying the present invention.

As shown in FIG. 1, the illustrated embodiment of the present invention is an enterprise system that comprises: a plurality of distributed networks 21, 23, 25, and a master network 27. Networks 21, 23 and 25 are physical accounts that are at different geographical locations A, B . . . N. Each of the distributed networks includes a physical system 29 and an electronic system 31. The master network, which physically is at a central location X, includes a physical system 33 and an electronic system 35.

Figure 4:
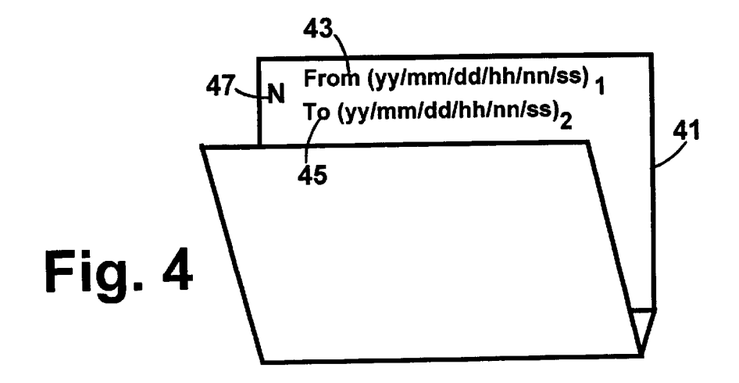
FIG. 4 illustrates a file folder having visual indicia specifying a date/time interval that bounds a sequence of physical paper documents of the type corresponding to the thumbnail images of FIG. 2.

Physical system 29 includes a scanner 37 for processing random sequences of paper documents 39 to produce sequences of electronic image documents in sequences of date/time instances. Sequences of paper or plastic folders 41 in turn store the sequences of paper documents. As is shown in FIG. 4, each of folders 41 is marked with indicia 43, 45, which indicate the beginning and ending of the range of date/time instances of the paper documents therewithin, and additionally the physical location 47 of the relevant physical account. Sequences of cardboard boxes 49 store the sequences of folders 41. As is shown in FIG. 5, each of boxes 49 is marked with indicia 71, 73, which indicate the beginning and ending of the range of date/time instances of the folders therewithin, and additionally the physical location 75 of the relevant physical account.

Figure 2:
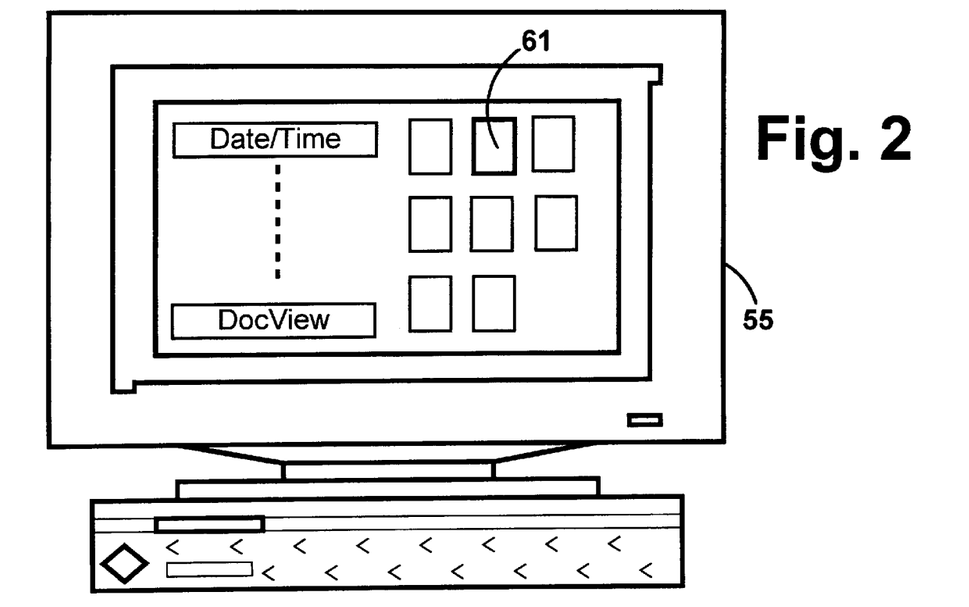
FIG. 2 illustrates a graphical user interface having date/time indexing features and an imaging window that displays thumbnail views of documents, the entries of which fall within a specific time interval.
Figure 3:
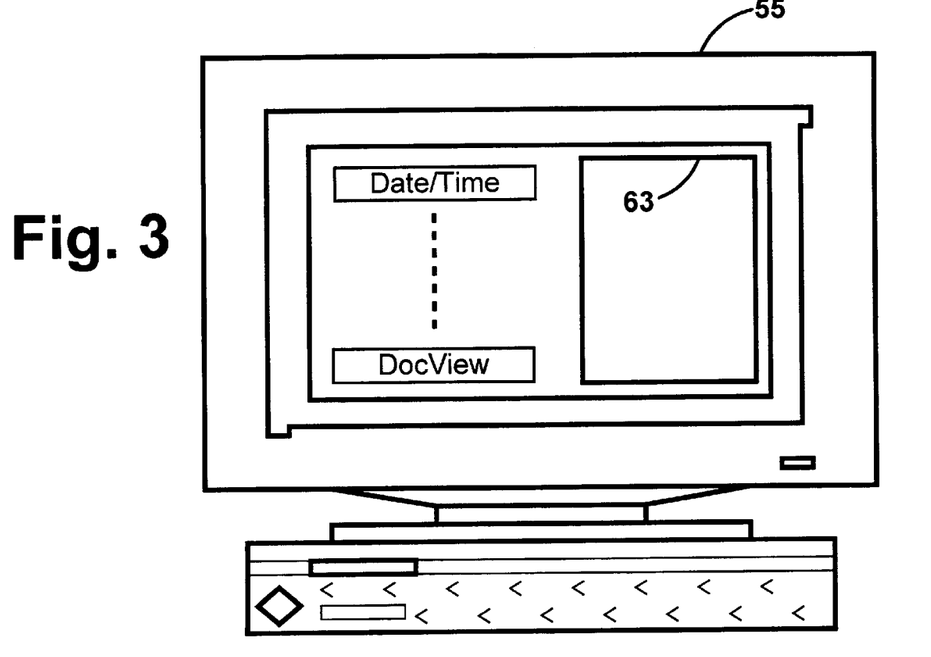
FIG. 3 illustrates a graphical user interface having date/time indexing features and an imaging window that displays a blow-up view corresponding to one of the thumbnail views of FIG. 2, the entries of which fall within a specific time interval.

Electronic system 31 includes a file server 53 that is operatively connected to scanner 37 for transmission to the scanner of control signals, and receipt from the scanner of data signals representing image documents and their unique date/time instance identifiers. A plurality of workstations 55 are operatively connected to server 53 via a hub 57. Workstations 55 can call up electronic documents, including image documents, from server 53 and/or can generate electronic documents, including text, vector and bitmap documents for transmission to server 53 and recording in terms of the date/time instances of their creation. Server 53 in turn is operatively connected to a bridge 59 for further processing of its electronic image and computer generated documents. As shown in FIGS. 2 and 3, workstations 55 can present the image documents generated by scanner 37 as thumbnail views 61 or blow-up views 63.

Figure 5:
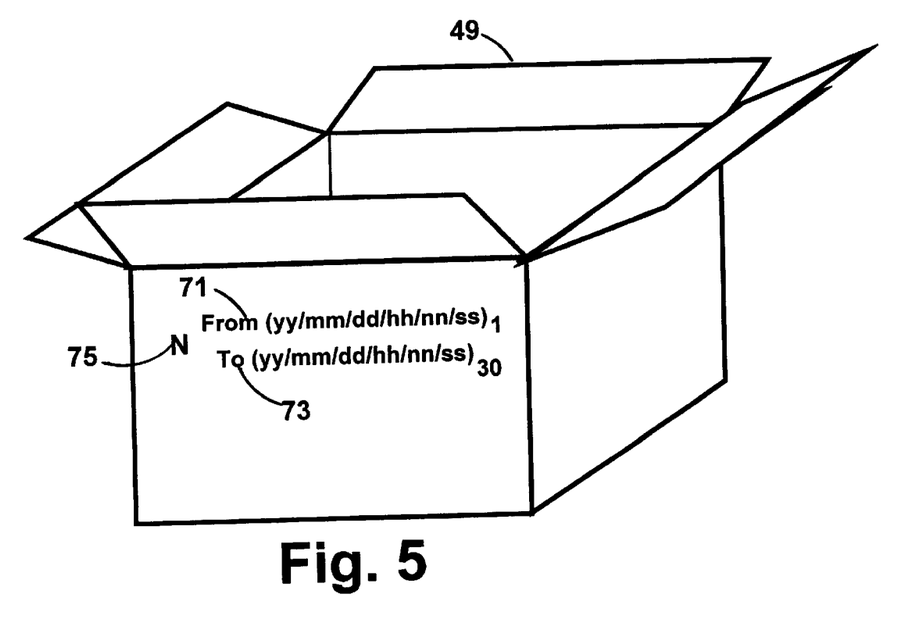
FIG. 5 illustrates a box having visual indicia specifying a date/time interval that bounds a sequence of file folders of the type corresponding to the file folder of FIG. 4.
Figure 6:
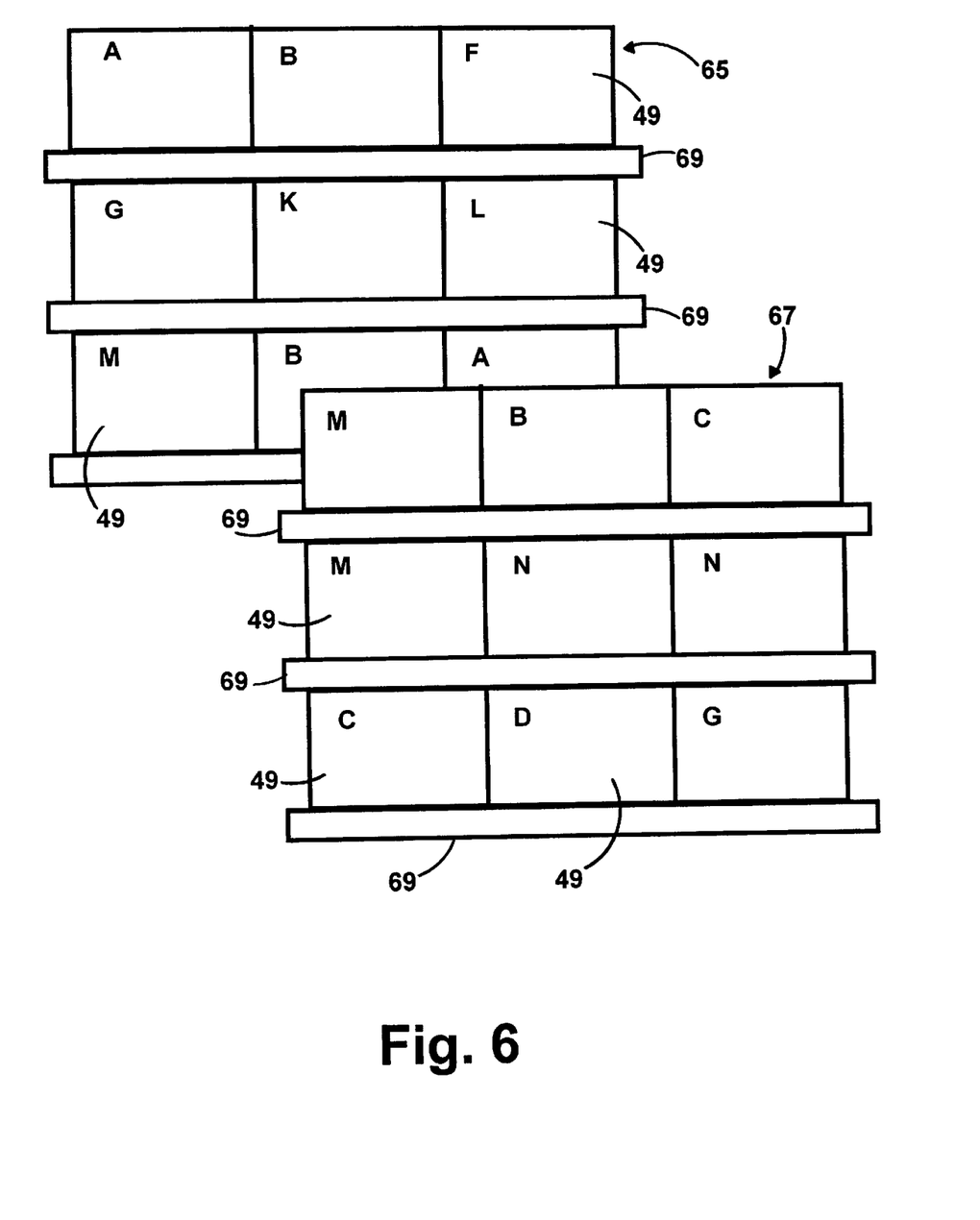
FIG. 6 illustrates a plurality of stacks of boxes of the type shown in FIG. 5.

As shown in FIGS. 1, 5 and 6, physical system 33 of master network 27 includes a plurality of off-site depositories 65, 67, each of which includes a plurality of shelves 69. Stored on the shelves are boxes 49 and/or other bundles, which contain folders 41 and/or other physical objects. As stated previously in connection with FIG. 5, each of boxes 49 is marked with indicia 71, 73, which indicate the beginning and ending of the range of date/time instances of the folders therewithin, and indicium 75 which indicates the location of the account from which the box was physically shipped.

Preferably, indicia 43, 45, 47, 71, 73 and 75 are presented in both date/time alphanumeric characters and date/time bar code. In an alternative embodiment, these indicia are presented in other alphanumeric characters and/or other bar codes that indirectly refer to date/time instances. The arrangement is such that any of the boxes themselves, or any of the folders they contain are available for convenient retrieval.

As shown in FIG. 1, electronic system 35 includes a database server 77, which is operatively connected to a bridge 79. Bridge 79 in turn is operatively connected to the bridges 59 of distributed networks A, B . . . N. Server 77 also is operatively connected to a master electronic storage 81, which is the central electronic repository of all relevant image generated electronic documents and all relevant computer generated electronic documents in the illustrated enterprise system.

Figure 7:
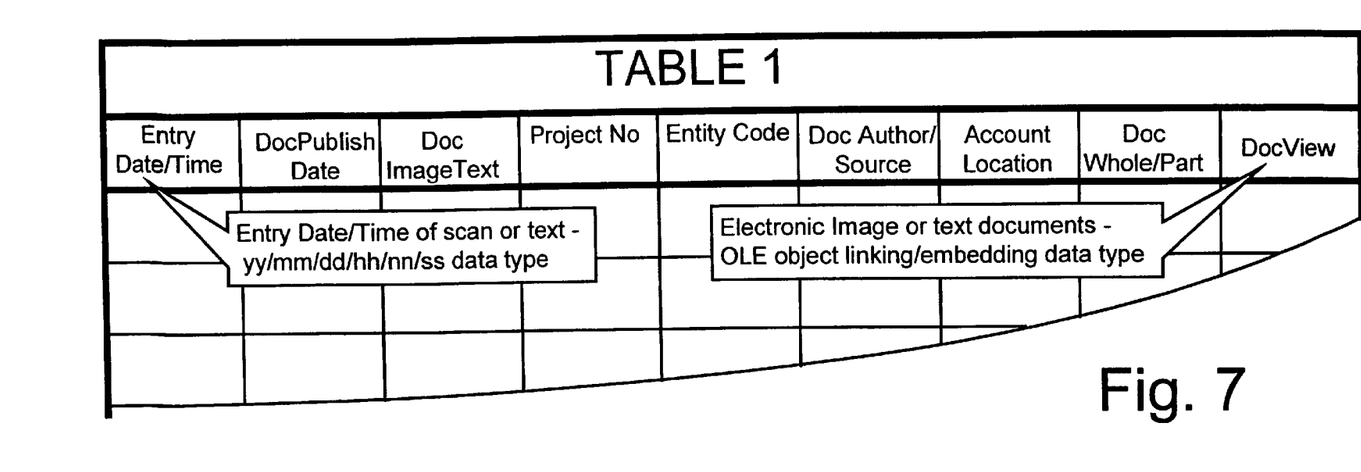
FIG. 7 illustrates a table of a relational database that supports the enterprise system of FIG. 1.
Figure 8:
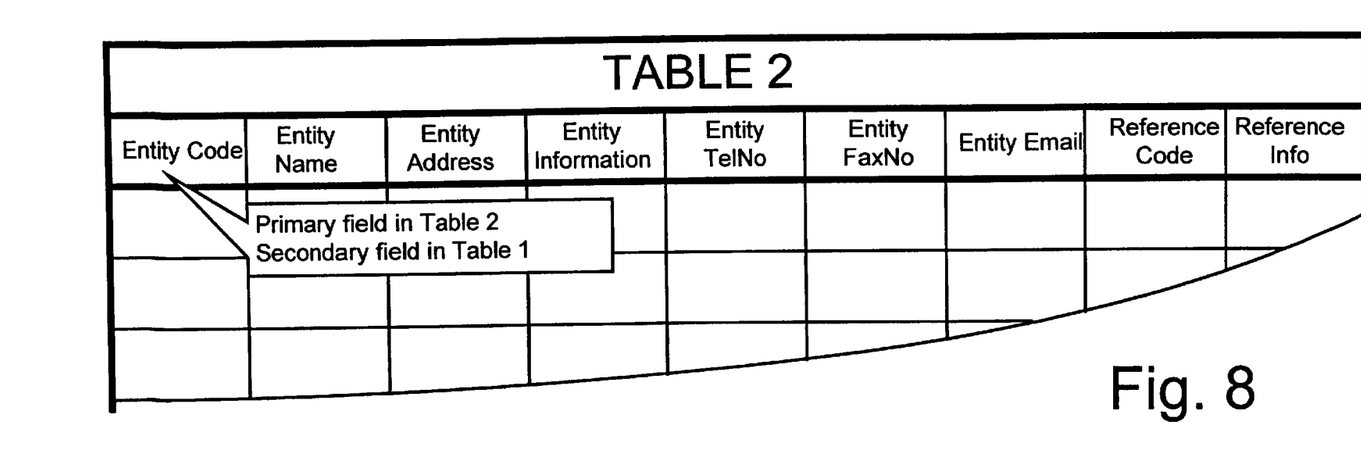
FIG. 8 illustrates another table of the relational database referred to in FIG. 7.
Figure 9:
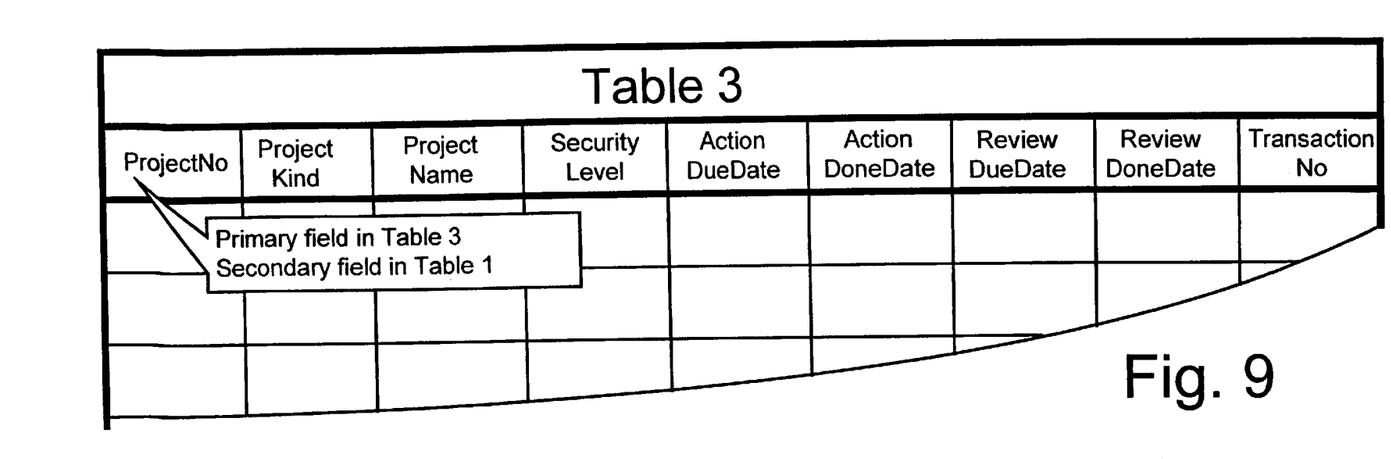
FIG. 9 illustrates another table of the relational database referred to in FIGS. 7 and 8.
Figure 10:
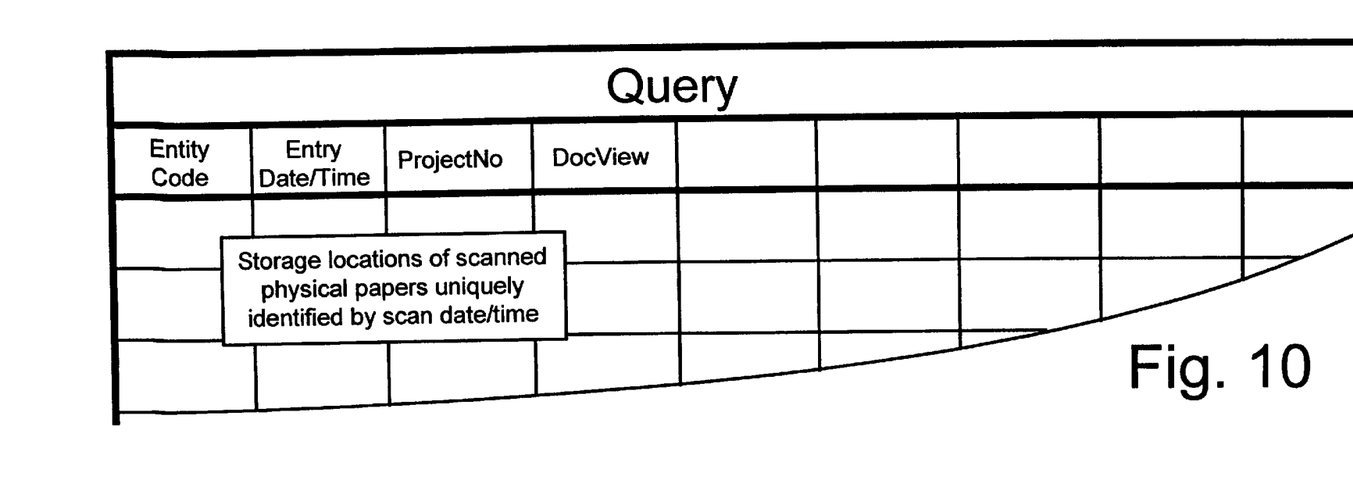
FIG. 10 illustrates a query of the relational database referred to in FIGS. 7, 8 and 9.

Electronic system 35 provides and controls a relational database, which includes tables that are shown in FIGS. 7, 8 and 9, and a query that is shown in FIG. 10. These tables and query are described in the following schedules.

SCHEDULE 1 (See Table 1, FIG. 7)

| Field Name | Data Type | Field Type - Description |
| --- | --- | --- |
| Entry Date/Time | Date/Time | Primary - unique entry date/time - in terms of yy/mm/dd/hh/nn/ss |
| DocPublishDate | Text | Secondary - actual date of document |
| DocImage/Test | Text | Secondary - generated by [1] scanner or [2] Computer |
| ProjectNo | Text | Secondary - project identification |
| EntityCode | Text | Secondary - entity identification |
| DocAuthor/Source | Text | Secondary - name of author/source |
| AccountLocation | Text | Secondary - ID of location of distributed server A, B . . . N |
| DocWhole/Part | Text | Secondary - MANY field - Unique Identifier of associated organization or individual |
| DocView | OLE | ONE field - object linking/embedding - image or text document presentation |

SCHEDULE 2 (See Table 2, FIG. 8)

| Field Name | Data Type | Field Type - Description |
| --- | --- | --- |
| EntityCode | Text | Primary - unique identifier of associated organization or individual |
| EntityName | Text | Secondary - name of organization or individual |
| EntityAddress | Text | Secondary - address of organization or individual |
| EntityTelNo | Telephone | Secondary - telephone number of organization or individual |
| EntityFaxNo | Telephone | Secondary - fax number of organization or individual |
| EntityEmail | Text | Secondary - uniform resource locator of organization or individual |
| EntityInfo | Text | Secondary - noteworthy information |
| ReferenceCode | Text | Secondary - entity code of contact or other associated individual |
| ReferenceInfo | Text | Secondary - noteworthy information |

SCHEDULE 3 (See Table 3, FIG. 10)

| Field Name | Data Type | Field Type - Description |
| --- | --- | --- |
| ProjectNo | Text | Primary - unique identifier of associated project |
| ProjectKind | Text | Secondary - select from categories [1], [2] . . . [n] |
| ProjectName | Text | Secondary - name of project |
| SecurityLevel | Text | Secondary - select from categories [1], [2] . . . [n] |
| ActionDueDate | Date/Time | Secondary - task performance date |
| ActionDoneDate | Date/Time | Secondary - date task performed |
| ReviewDueDate | Date/Time | Secondary - final review date |
| ReviewDoneDate | Date/Time | Secondary - date review performed |
| TransactionNo | AutoNumber | Secondary - all entries noted |

SCHEDULE 4 (See Query, FIG. 10)

| EntityCode | ProjectNo. | DocView | DocWhole/Part |
| --- | --- | --- | --- |

Preferably, a value in the date/time field of TABLE 1 is automatically generated by the system during scanning or computer generation, preferably in terms of year, month, day, hour, minute and second (yy, mm, dd, hh, nn, ss). As a practical matter, a duplicate automatically generated value in the date/time field is precluded in a local area network since any slight automatic delay will cause the generation of a second nonduplicate value. Thus each electro-optically generated document or computer generated document is uniquely identified at the moment of its creation by a date/time entry.

The physical sub-system, assuming that hard (paper) copies of computer generated documents are not filed, comprises a simple stack of papers that are in the order of the date/time sequence of images, i.e. their electro-optical creation (scanning). The system also permits hard (paper) copies of computer generated documents to be printed and stored in the same date/time sequence. For convenience, this stack is separated by dividers or containers into date/time intervals. Since the precise location of any original is indicated by its date/time instance, its manual or machine accessibility is immediate and unambiguous. Each of the designated stacks is physically assigned a date/time interval, and each of the corresponding images is electronically assigned a date/time entry within that interval.

The integrity of any designated stack is maintained by monitoring the physical storage and retrieval of any processed document to and from that stack. The operation is such that scanning a series of randomly collected documents produces, interactively in real time, physical stacks of the processed documents and electronic groups of corresponding images. Each of the stacks is marked with a visual indicium of a date/time interval. Each of the images is identified by an electronic indicium of a date/time entry within that interval.

Operation

Pursuant to the present invention, at each geographical location, (1) electro-optically generated electronic documents are produced by scanning newly received paper documents at random, and computer generated electronic documents are produced at the distributed work stations or the distributed servers by newly received fax or e-mail documents, all in date/time sequence, (2) any original paper or other hard documents to be saved are stored in date/time sequence, and (3) the images are processed and organized to provide the electronic equivalent of organized files of paper documents. The result is an interactive combination of electronic and physical sub-systems that operate in the following manner. The hard documents are arranged in batches that are stacked in the secondary depositories, i.e. folders and boxes. Each of the batches of hard documents corresponds to a limited range of successive date/time instances and each of the secondary depositories is marked with visual indicia matching this limited range. Scattered through the various batches of hard documents are selected hard documents that are related logically by selected indicia other than date/time. The master electronic system computes and retrieves requested subsets of the electronic images corresponding to these selected hard documents.

What is claimed is:

1. A data storage network comprising:
(a) a plurality of distributed systems and a master system;
(b) said distributed systems being at different physical locations;
(c) each of said distributed systems including a distributed physical system and a distributed electronic system;
(d) said master system being at a particular physical location;
(e) said master system including a master physical system and a master electronic system;
(f) each of said distributed physical systems including a scanner for processing random sequences of physical paper documents to produce corresponding sequences of electronic image documents in real-time sequences of date/time instances;
(g) said master physical system including a master physical repository for storing said random sequences of paper documents in physical repositories that are uniquely marked by indicia referring to said date/time instances;
(h) said master electronic system including a master electronic database for storing said sequences of electronic image documents in reference to said date/time instances established by said distributed systems;
(i) said paper documents in said storage repositories being logically classified in terms of said date/time instances;
(e) said paper documents in said sequences of paper documents being logically classified by other identifiers into restricted virtual groups;
(f) paper documents of different ones of said restricted virtual groups being intermingled physically in said sequences of paper documents;
(g) said distributed electronic systems presenting said electronic image documents in restricted electronic groups that correspond to said restricted virtual groups.

2. The network system of claim 1 wherein said date/time instances specify seconds.

3. A network system comprising:
(a) a plurality of distributed networks and a master network;
(b) said distributed networks being at different physical locations;
(c) each of said distributed networks including a distributed physical system and a distributed electronic system,
(d) said master network being located at a particular physical location;
(e) said master system including a master physical system and a master electronic system;
(f) each of said distributed physical networks including a scanner for processing random sets of paper documents to produce corresponding sets of electronic image documents in real-time sets of date/time instances;
(g) said master physical network including a master physical depository for storing said random sets of paper documents in a collection of storage locations, each of said storage locations being uniquely marked with indicia that uniquely refer to said date/time instances;
(h) said master electronic system including a master electronic database for storing said sets of electronic image documents in reference to said sets of date/time instances;
(i) said paper documents in said storage locations being logically classified in terms of said date/time instances;
(e) said paper documents in said physical collection being logically classified by other identifiers into restricted virtual groups;
(f) paper documents of different ones of said restricted virtual groups being intermingled physically throughout said sequences of paper documents;
(g) said distributed electronic systems presenting said electronic image documents in restricted electronic groups that correspond to said restricted virtual groups.

4. The network system of claim 3 wherein said date/time instances specify seconds.

5. A document storage and retrieval network comprising a plurality of distributed systems and a master system:
   (a) each distributed system of said plurality of distributed systems including a distributed physical system, a distributed electronic system, and a distributed scanner for converting a distributed sequence of distributed paper sheets to a distributed sequence of distributed electronic images at a distributed sequence of distributed date/time instances, each one of said distributed date/time instances uniquely designating a distributed matched pair of one of said distributed paper sheets and one of said distributed electronic images;
   (b) said distributed physical system including a distributed primary physical repository and a plurality of distributed secondary physical repositories therein, selected ranges of said distributed sequence of distributed paper sheets corresponding to selected ranges of said distributed date/time instances, said selected ranges of said distributed sequences of distributed paper sheets being contained by selected ones of said distributed secondary physical repositories said selected ones of said distributed secondary physical repositories being visually marked with physical indicia corresponding to said selected ranges of said distributed date/time instances:
   (c) said logical groups of said distributed paper sheets including virtual collections of said distributed paper sheets that are intermingled throughout said distributed secondary repositories so as to be unadapted for immediate physical compilation, the location in said distributed secondary repositories of any one distributed paper sheet being indicated by a record that includes the date/time instance by which said one distributed paper sheet is uniquely identified, said logical groups of said electronic images being identified by logical groups of said electronic records so as to be adapted for immediate electronic compilation.

6. The document storage and retrieval network of claim 5, wherein said distributed primary depository is a box and imprinted on said box are visual indicia specifying a limited date/time range of distributed paper sheets therein.

7. The document storage and retrieval network of claim 5, wherein each of said distributed secondary depositories is a folder and imprinted on said folder are visual indicia specifying a limited date/time range of distributed paper sheets therein.

8. The document storage and retrieval network of claim 5, wherein said master physical system contains physical repositories from said distributed physical systems.

9. The document storage and retrieval network of claim 5, wherein said distributed physical systems include distributed servers and pluralities of digital clients operatively connected thereto, said digital clients being operatively connected to said servers via hubs.

10. The document storage and retrieval network of claim 5, wherein said distributed electronic systems include distributed servers, distributed hubs, distributed bridges, and distributed pluralities of digital clients, and wherein said master electronic system includes a master bridge, said distributed pluralities of digital clients being operatively connected to said servers by said distributed hubs, said distributed servers being operatively connected to said distributed bridges, said distributed bridges being operatively connected to said master bridge.

11. A document storage and retrieval network comprising a plurality of distributed stations and a master station:
   (a) each distributed station of said plurality of distributed stations including a distributed physical system, a distributed electronic system, and a distributed scanner for converting a distributed sequence of distributed paper sheets to a distributed sequence of distributed electronic images at a distributed sequence of distributed date/time instances, each one of said distributed date/time instances uniquely designating a distributed matched pair of one of said distributed paper sheets and one of said distributed electronic images;
   (b) said distributed physical system including a distributed primary physical repository and a plurality of distributed secondary physical repositories therein, selected ranges of said distributed sequence of distributed paper sheets corresponding to selected ranges of said distributed date/time instances said selected ranges of said distributed sequences of distributed paper sheets being contained by selected ones of said distributed secondary physical repositories said selected ones of said distributed secondary physical repositories being visually marked with physical indicia corresponding to said selected ranges of said distributed date/time instances;
   (c) said master electronic system presenting an electronic table representing a grid containing rows of electronic records and columns of electronic fields, said electronic fields including at least a ONE electronic field and at least a plurality of MANY electronic fields, said ONE electronic field including a sequence of date/time entries that designate a corresponding distributed sequence of said distributed paper sheets and said distributed electronic images, said MANY electronic fields including arrangements of other entries that designate corresponding arrangements of logical groups of said distributed paper sheets and logical groups of said distributed electronic images;
   (d) said logical groups of said distributed paper sheets including virtual collections of said distributed paper sheets that are intermingled throughout said distributed secondary repositories so as to be unadapted for immediate physical compilation, the location in said distributed secondary repositories of any one distributed paper sheet being indicated by a record that includes the date/time instance by which said one distributed paper sheet is uniquely identified, said logical groups of said electronic images being identified by logical groups of said electronic records so as to be adapted for immediate electronic compilation.

12. The document storage and retrieval network of claim 11 wherein said distributed primary depository is a box and imprinted on said box are visual indicia specifying a limited date/time range of distributed paper sheets therein.

13. The document storage and retrieval network of claim 11 wherein each of said distributed secondary depositories is a folder and imprinted on said folder are visual indicia specifying a limited date/time range of distributed paper sheets therein.

14. The document storage and retrieval network of claim 11, wherein said master physical system contains physical repositories from said distributed physical systems.

15. The document storage and retrieval network of claim 11, wherein said distributed physical systems include distributed servers and pluralities of digital clients operatively connected thereto, said digital clients being operatively connected to said servers via hubs.

16. The document storage and retrieval network of claim 11, wherein said distributed electronic systems include distributed servers, distributed hubs, distributed bridges, and distributed pluralities of digital clients, and wherein said master electronic system includes a master bridge, said distributed pluralities of digital clients being operatively connected to said servers by said distributed hubs, said distributed servers being operatively connected to said distributed bridges said distributed bridges being operatively connected to said master bridge.

17. A document storage and retrieval network comprising a plurality of distributed stations and a master station:

(a) each distributed station of said plurality of distributed stations including a distributed physical system, a distributed electronic system, and a distributed scanner for converting a distributed sequence of distributed physical sheets to a distributed sequence of distributed electronic images at a distributed sequence of distributed date/time instances, each one of said distributed date/time instances uniquely designating a distributed matched pair of one of said distributed physical sheets and one of said distributed electronic images;

(b) said distributed physical system including a distributed primary physical repository and a plurality of distributed secondary physical repositories therein, selected ranges of said distributed sequence of distributed physical sheets corresponding to selected ranges of said distributed date/time instances, said selected ranges of said distributed sequences of distributed paper sheets being contained by selected ones of said distributed secondary physical repositories, said selected ones of said distributed secondary physical repositories being visually marked with physical indicia corresponding to said selected ranges of said distributed date/time instances;

(c) said master electronic system presenting an electronic table representing a grid containing rows of electronic records and columns of electronic fields, said electronic fields including at least a ONE electronic field and at least a plurality of MANY electronic fields, said ONE electronic field including a sequence of date/time entries that designate a corresponding distributed sequence of said distributed physical sheets and said distributed electronic images, said MANY electronic fields including arrangements of other entries that designate corresponding arrangements of logical groups of said distributed physical sheets and logical groups of said distributed electronic images.

(d) said logical groups of said distributed physical sheets including virtual collections of said distributed paper sheets that are intermingled throughout said distributed secondary repositories so as to be unadapted for immediate physical compilation, the location in said distributed secondary repositories of any one distributed physical sheet being indicated by a record that includes the date/time instance by which said one distributed physical sheet is uniquely identified, said logical groups of said electronic images being identified by logical groups of said electronic records so as to be adapted for immediate electronic compilation;

(e) said distributed primary depository being a box and imprinted on said box there being visual indicia specifying a limited date/time range of distributed physical sheets therein, certain of said distributed secondary depositories being folders and imprinted on said folders there being visual indicia specifying limited date/time ranges of distributed physical sheets therein, said master physical system containing physical repositories from said distributed physical systems;

(f) said distributed electronic systems including distributed servers, distributed hubs, distributed bridges, and distributed pluralities of digital clients, and said master electronic system including a master bridge, said distributed pluralities of digital clients being operatively connected to said servers by said distributed hubs, said distributed servers being operatively connected to said distributed bridges, said distributed bridges being operatively connected to said master bridge.

18. A document storage and retrieval system comprising a plurality of physical networks for filing sets of physical sheets, scanners for converting said sequences of physical sheets to sequences of electronic images at sequences of date/time instances, and a plurality of electronic systems for filing said sequences of electronic images, each one of said date/time instances uniquely designating a matched pair of one of said physical sheets and one of said electronic images:

(a) each of said physical systems including a primary physical repository and a plurality of secondary physical repositories therein, selected ranges of said sets of physical sheets corresponding to selected ranges of said date/time instances, said selected ranges of said physical sheets being contained by selected ones of said secondary physical repositories, said selected ones of said secondary physical repositories being visually marked with physical indicia corresponding to said selected ranges of said date/time instances;

(b) each of said electronic systems presenting an electronic table representing a grid containing rows of electronic records and columns of electronic fields, said electronic fields including at least one primary electronic field and at least a plurality of secondary electronic fields, said primary field including a sequence of date/time entries that designate a corresponding sequence of said physical sheets and said electronic images, said secondary fields including arrangements of other entries that designate corresponding arrangements of other logical groups of said physical sheets and logical groups of said electronic images;

(c) said logical groups of said physical sheets including virtual sets of said physical sheets that are intermingled throughout said secondary repositories so as to be unadapted for immediate physical compilation, the location in said secondary repositories of any one physical sheet being indicated by a record that includes the date/time instance by which said one physical sheet is uniquely identified, said logical groups of said electronic images being identified by logical groups of said electronic records so as to be adapted for immediate electronic compilation.

* * * * *